(12) United States Patent
Hecht

(10) Patent No.: US 11,316,857 B2
(45) Date of Patent: Apr. 26, 2022

(54) AUTOMATED CREATION OF DYNAMIC PRIVILEGED ACCESS RESOURCES

(71) Applicant: CyberArk Software Ltd., Petach-Tikva (IL)

(72) Inventor: Asaf Hecht, Tel Aviv (IL)

(73) Assignee: Cyber Ark Software Ltd., Petach-Tikva (IL)

(*) Notice: Subject to any disclaimer, the term of this patent is extended or adjusted under 35 U.S.C. 154(b) by 140 days.

(21) Appl. No.: 16/032,466

(22) Filed: Jul. 11, 2018

(65) Prior Publication Data
US 2020/0021591 A1    Jan. 16, 2020

(51) Int. Cl.
| | | |
|---|---|---|
| *H04L 29/06* | (2006.01) | |
| *G06F 9/455* | (2018.01) | |
| *H04W 4/50* | (2018.01) | |

(52) U.S. Cl.
CPC .......... *H04L 63/10* (2013.01); *G06F 9/45558* (2013.01); *H04L 63/08* (2013.01); *H04W 4/50* (2018.02); *G06F 2009/45595* (2013.01)

(58) Field of Classification Search
CPC ....... H04L 63/10; H04L 63/08; H04L 63/102; H04W 4/50; G06F 9/45558; G06F 2009/45595
See application file for complete search history.

(56) References Cited

U.S. PATENT DOCUMENTS

| | | | | |
|---|---|---|---|---|
| 7,080,406 B2* | 7/2006 | Burnett | ................... | G06F 21/31 |
| | | | | 707/999.009 |
| 7,735,100 B1* | 6/2010 | Sallam | ..................... | H04L 63/10 |
| | | | | 719/330 |
| 9,652,306 B1* | 5/2017 | Wagner | ................... | H04L 41/06 |
| 10,182,033 B1* | 1/2019 | Farhangi | ............. | H04L 43/0876 |
| 2006/0242405 A1* | 10/2006 | Gupta | ..................... | H04L 9/321 |
| | | | | 713/156 |
| 2009/0100438 A1* | 4/2009 | Hinton | .................... | H04L 67/02 |
| | | | | 719/311 |
| 2014/0068767 A1* | 3/2014 | Mao | ........................ | G06F 21/57 |
| | | | | 726/23 |
| 2015/0082373 A1* | 3/2015 | Kottahachchi | ........ | H04L 63/102 |
| | | | | 726/1 |
| 2015/0319183 A1* | 11/2015 | Liske | .................... | G06F 21/566 |
| | | | | 726/23 |
| 2019/0294477 A1* | 9/2019 | Koppes | ................. | G06F 9/5072 |

FOREIGN PATENT DOCUMENTS

WO    WO-2015168203 A1 * 11/2015   ............. G06N 20/00

* cited by examiner

*Primary Examiner* — Mohammed Waliullah
(74) *Attorney, Agent, or Firm* — Finnegan, Henderson, Farabow, Garrett & Dunner, LLP

(57) ABSTRACT

Disclosed embodiments include techniques for automatically provisioning dynamic privileged access resources. Aspects may involve receiving a notification that an identity is seeking to participate in a privileged session with an access-restricted network resource, and automatically provisioning, in response to the notification, a privileged access resource for use by the identity in participating in the privileged session with the access-restricted network resource. Further, aspects may include determining that the privileged session with the access-restricted network resource has ended, and automatically deprovisioning, based on the determination, the privileged access resource.

24 Claims, 4 Drawing Sheets

300

AUTOMATED CREATION OF DYNAMIC PRIVILEGED ACCESS RESOURCES

BACKGROUND

In a network environment, privileged accounts and their associated credentials are critically important assets. Privileged accounts have the power to control the entire network environment and, thus, require a high level of security.

One common technique to provide privileged network access while protecting privileged accounts is setting up a privilege access workstation (PAW). Privileged accounts may then be isolated and logged in only to monitored and secured machines, i.e., PAWs. The security benefit from this isolation is potentially strong, as the use of PAWs protects the privileged accounts and privileged assets from phishing attacks, impersonation attacks, credential theft attacks, and the like. In contrast, endpoint machines, or regular workstations, in the network environment are typically connected to the Internet, such that users log in and perform their daily tasks. Those endpoint machines are more vulnerable to attacks than PAWs because their attack surface is much larger. For example, by virtue of their connectivity to the Internet, a user working on an endpoint machine may click on unsecured links, open malicious phishing emails, connect unknown USB disk-on-key devices to the endpoint machine, and so on.

The isolation of the privileged accounts to dedicated PAWs is crucial in preventing potential attackers from escalating their privileges through the network environment. Without the isolation of a PAW, a successful attacker may steal the privileged credentials, impersonate the privileged account, and continue with malicious actions on other privileged resources of the network.

Consequently, there are technological needs for systems and methods that more flexibly and dynamically provide elevation of privileged access when needed. Techniques are needed for automatically provisioning dynamic privileged access resources. Such systems and methods should enable a user to create dynamic PAW sessions to access restricted network resources. Further, such systems and methods should avoid the need of prior techniques to have separate servers dedicated to functioning as proxy servers. In addition, such techniques should account for the dynamically changing system environment in which they operate, where sessions and permissions may be constantly changing.

SUMMARY

The disclosed embodiments describe non-transitory computer readable media and methods for automatically provisioning dynamic privileged access resources. For example, in an exemplary embodiment, there may be a non-transitory computer readable medium including instructions that, when executed by at least one processor, cause the at least one processor to perform operations for automatically provisioning dynamic privileged access resources. The operations may comprise receiving a notification that an identity is seeking to participate in a privileged session with an access-restricted network resource. The operations may also comprise automatically provisioning, in response to the notification, a privileged access resource for use by the identity in participating in the privileged session with the access-restricted network resource. Further, the operations may comprise determining that the privileged session with the access-restricted network resource has ended. The operations may also comprise automatically deprovisioning, based on the determination, the privileged access resource.

Automatically provisioning a privileged access resource may include providing authentication information for use by the identity in accessing the access-restricted network resource. Automatically provisioning a privileged access resource may also include limiting network access rights of the privileged access resource based on network access rights needed to participate in the privileged session with the access-restricted network resource. Further, automatically provisioning a privileged access resource may also include limiting functionality of the privileged access resource based on functionality needed to participate in the privileged session with the access-restricted network resource.

According to a disclosed embodiment, the privileged access resource may be an on-premises computer system being used by the identity.

According to a disclosed embodiment, the automatically provisioning may include automatically elevating the identity's privileged access rights.

According to a disclosed embodiment, the privileged access resource may be a virtual computing resource spun up for use by the identity.

According to a disclosed embodiment, the virtual computing resource may be dynamically spun up in response to the notification.

According to a disclosed embodiment, the virtual computing resource may be a serverless code element.

According to a disclosed embodiment, the virtual computing resource may be dynamically terminated in response to the determination that the privileged session with the access-restricted network resource has ended.

According to a disclosed embodiment, providing the authentication information may include providing the authentication information to the privileged access resource for use by the identity.

According to a disclosed embodiment, providing the authentication information may include enabling the privileged access resource to use the authentication information without providing the authentication information to the privileged access resource.

According to a disclosed embodiment, automatically deprovisioning the privileged access resource may include revoking the identity's access to the authentication information.

According to a disclosed embodiment, limiting the network access rights of the privileged access resource may include limiting the IP addresses with which the privileged access resource is allowed to communicate.

According to a disclosed embodiment, limiting the functionality of the privileged access resource may include blocking a local operation on the privileged access resource.

According to a disclosed embodiment, limiting the functionality of the privileged access resource may include hooking a local operation on the privileged access resource.

According to another disclosed embodiment, a method may be implemented for automatically provisioning dynamic privileged access resources. The method may comprise receiving a notification that an identity is seeking to participate in a privileged session with an access-restricted network resource. The method may also comprise automatically provisioning, in response to the notification, a privileged access resource for use by the identity in participating in the privileged session with the access-restricted network resource. Further, the method may comprise determining that the privileged session with the access-restricted network resource has ended. In addition, the method may comprise automatically deprovisioning, based on the determination, the privileged access resource.

Automatically provisioning a privileged access resource may include providing authentication information for use by the identity in accessing the access-restricted network resource. Automatically provisioning a privileged access resource may also include limiting network access rights of the privileged access resource based on network access rights needed to participate in the privileged session with the access-restricted network resource. Further, automatically provisioning a privileged access resource may also include limiting functionality of the privileged access resource based on functionality needed to participate in the privileged session with the access-restricted network resource.

According to another disclosed embodiment, the notification may be received by a software agent running locally on a computing device associated with the identity.

According to another disclosed embodiment, the notification may be received by a server remote from a computing device associated with the identity.

According to another disclosed embodiment, the notification may be received based on machine learning process that predicts that the identity will seek to participate in the privileged session with the access-restricted network resource.

According to another disclosed embodiment, limiting the functionality of the privileged access resource may include terminating a non-permitted process running on the privileged access resource.

According to another disclosed embodiment, limiting the functionality of the privileged access resource may include forcing the identity to terminate an open account session.

According to another disclosed embodiment, automatically provisioning the privileged access resource may include restarting the privileged access resource.

According to another disclosed embodiment, automatically provisioning the privileged access resource may include installing an application on the privileged access resource for use by the identity in accessing the access-restricted network resource.

According to another disclosed embodiment, automatically deprovisioning the privileged access resource may include deleting a local process memory associated with the privileged access resource.

According to another disclosed embodiment, receiving the notification may occur automatically based on monitoring activities of the identity.

According to another disclosed embodiment, receiving the notification may occur based on a request by the identity to provision the privileged access resource.

Aspects of the disclosed embodiments may include tangible computer-readable media that store software instructions that, when executed by one or more processors, are configured for and capable of performing and executing one or more of the methods, operations, and the like consistent with the disclosed embodiments. Also, aspects of the disclosed embodiments may be performed by one or more processors that are configured as special-purpose processor(s) based on software instructions that are programmed with logic and instructions that perform, when executed, one or more operations consistent with the disclosed embodiments.

It is to be understood that both the foregoing general description and the following detailed description are exemplary and explanatory only, and are not restrictive of the disclosed embodiments, as claimed.

BRIEF DESCRIPTION OF THE DRAWINGS

The accompanying drawings, which are incorporated in and constitute a part of this specification, illustrate disclosed embodiments and, together with the description, serve to explain the disclosed embodiments. In the drawings.

DETAILED DESCRIPTION

In the following detailed description, numerous specific details are set forth in order to provide a thorough understanding of the disclosed example embodiments. However, it will be understood by those skilled in the art that the principles of the example embodiments may be practiced without every specific detail. Well-known methods, procedures, and components have not been described in detail so as not to obscure the principles of the example embodiments. Unless explicitly stated, the example methods and processes described herein are not constrained to a particular order or sequence, or constrained to a particular system configuration. Additionally, some of the described embodiments or elements thereof can occur or be performed simultaneously, at the same point in time, or concurrently.

The various implementations described herein overcome many drawbacks of implementing PAW security measures. Proxy PAWs, for example, CyberArk's Privileged Session Manager™, may implement PAWs. However, proxy PAWs may require separate, dedicated proxy servers, resulting in excess cost associated with server hardware and maintenance. Additionally, the proxy servers are usually always running, even if they are not being used for an active privileged session. PAWs may also be implemented on virtual machines (VMs). For example, a PAW may be a restricted workstation for privileged actions, but may also include a VM that serves as a regular workstation within which the user can perform daily tasks and surf the internet. However, a VM implementation of a PAW may decrease workstation performance and is often uncomfortable and/or less intuitive to the user. Another solution for implementing a PAW is to have a separated workstation for the administrator's privileged actions, i.e., a separated PAW endpoint only used for privileged tasks. But in that situation, the user is required to have two workstations—one for daily tasks and a different one to perform privileged tasks. This implementation of a PAW requires the organization to invest in additional workstations and requires the administrator to perform tasks on two separate machines.

Reference will now be made in detail to the disclosed embodiments, examples of which are illustrated in the accompanying drawings.

Described herein are systems and methods for the automated creation of dynamic PAWs. Unlike the above described PAW implementations, dynamic PAWs do not require dedicated proxy servers and may account for continuously occurring changes in the network environment, such as inactive sessions and changing privileges.

Figure 1:
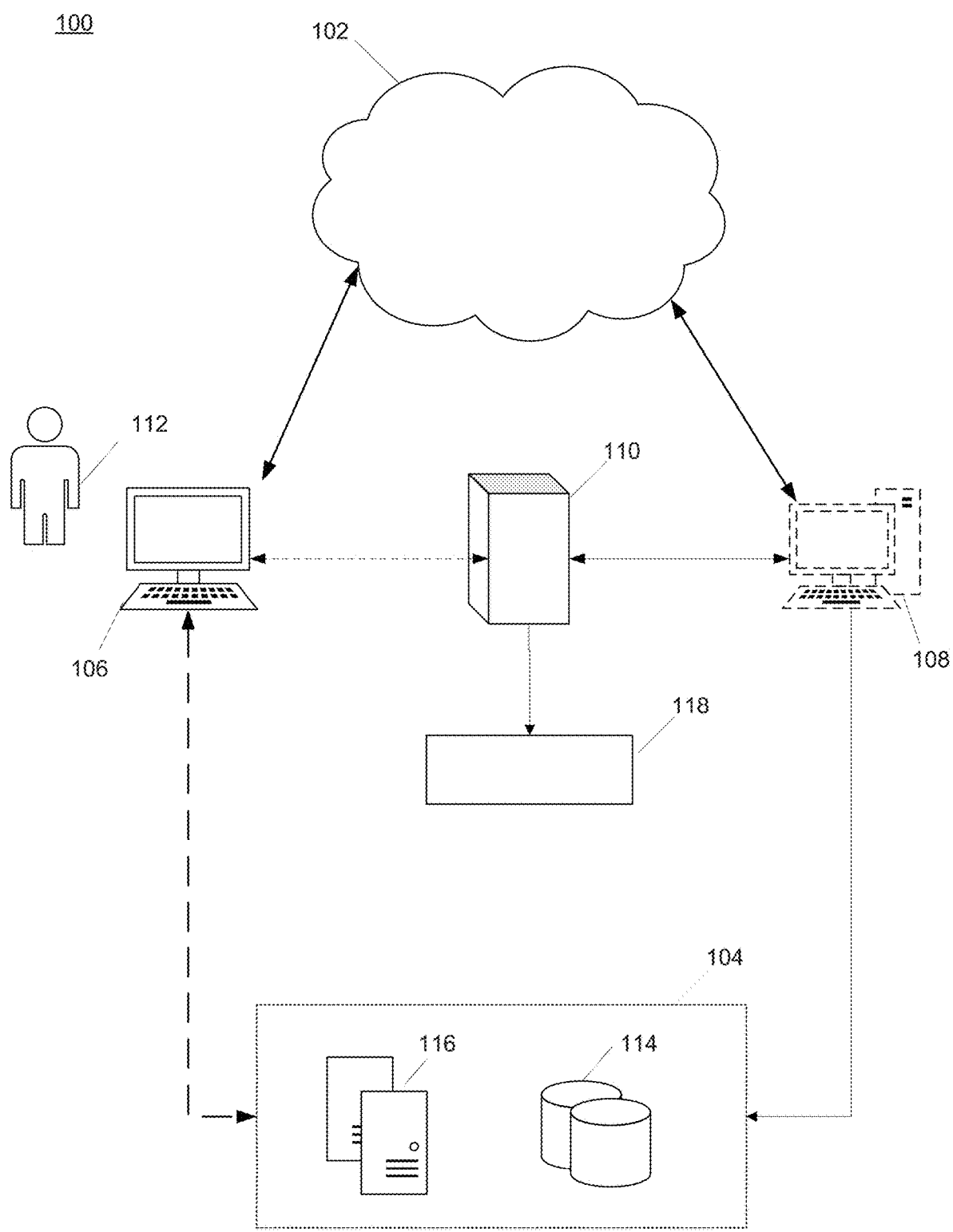
FIG. 1 is a block diagram of an example system, in accordance with disclosed embodiments.

FIG. 1 is a block diagram of an example system 100 for automated creation of dynamic PAWs consistent with disclosed embodiments. As shown, system 100 includes a network environment 102, access-restricted network resources 104, endpoint 106, cloud PAW 108, and auditing system 110. Endpoint 106 may be a computer or computing device used by an identity 112.

System 100 can be configured to automatically provision dynamic privileged access resources. For example, identity 112 or endpoint 106 may request a privileged session with an access-restricted network resource 104. Upon receiving the request, system 100 may determine whether to elevate the endpoint 106 to a PAW. In another embodiment, system 100 may spin up or modify an existing VM to serve as a cloud PAW 108.

Network environment 102 can include a cloud-computing platform, on-premises network, or a combination of both. For example, the network 102 may be based on any type of computer networking arrangement used to exchange data, such as the Internet, a wired Wide Area Network (WAN), a wired Local Area Network (LAN), a wireless WAN (e.g., WiMAX), a wireless LAN (e.g., IEEE 802.11, Bluetooth, etc.), a mobile network, a private data network, a virtual private network using a public network, and/or other suitable connection (e.g., NFC, infrared, etc.) that enables the system 100 to send and receive information between the components in the system 100.

Examples of suitable cloud-computing platforms on which network 102 may be based include, but are not limited to, MICROSOFT AZURE, AMAZON WEB SERVICES (AWS), GOOGLE CLOUD PLATFORM, IBM CLOUD, and similar systems. Network environment 102 can be configured to associate permissions with entities deployed to network environment 102. As a non-limiting example, when network environment 102 is provisioned by AWS, network environment 102 can use AWS IDENTITY AND ACCESS MANAGEMENT (IAM) to define permissions for entities deployed to network environment 102. In other embodiments, network environment 102 may be an on-premises environment or a combination of cloud and on-premises environments.

Network environment 102 may include one or more access-restricted network resources 104. An access-restricted network resource 104 may be any secure device, application, database, server, and/or network that requires an identity (e.g., identity 112) to be authenticated before accessing the resource. Access-restricted network resources 104 may be, for example, secure databases, e.g., databases 114 storing identity/organization credentials, confidential financial information, or other sensitive data; servers, e.g., servers 116 including WINDOWS, UNIX, and/or VMWARE servers; network routers/switches; or various other types of network-accessible resources. In some embodiments, access-restricted network resources 104 may only be accessed by an identity 112 via a PAW to reduce the vulnerability of the resources 104 to attack by an attacker outside the network environment 102, or by an attacker who has gained access to the environment 102.

An identity 112 may be any account, person, machine, IoT device, application, or entity attempting to access an access-restricted network resource 104, such as a database, server, storage device, another identity, etc. in the network environment 102. In some embodiments, identity 112 may be an automated and/or computerized entity. For example, a computerized entity may be a scheduled backup service, task, etc. performed by one or more processors or systems. Identity 112 may also be, for example, a local account on a computer or computer system that is established according to a particular operating system (e.g., MICROSOFT WINDOWS, MAC OS, UNIX, etc.), a particular security service, or another service or protocol governing the computer or computer system. Identity 112 may also be a network account, such as an account established according to a network operating system (e.g., a MICROSOFT network operating system, a CISCO network operating system, a DELL network operating system, a LINUX network operating system, etc.). Network 102 may be an on-premises network (e.g., local area network), a cloud network (e.g., private cloud, public cloud, or hybrid cloud network), or a combination of these types of networks.

Endpoint 106 may be any of a network node, a web server, a data storage device, a mobile device, a smartphone, a tablet computer, a desktop computer, a notebook computer, a wearable computer, a watch computer, a glasses computer, a computer at a kiosk, an IoT device, a smart home appliance, a vehicle infotainment system, etc. Other endpoints are possible as well.

Auditing system 110 may store session recordings and audit logs while also preventing identities from editing their activity history. For example, using a security information and event management (SIEM) system 118, security information management (SIM) system, and/or security event management (SEM) system, auditing system 110 may receive and store data indicative of what identities have accessed and/or modified access-restricted network resources 104, the geographic location from which the resources was accessed, information about the device from which the resource was accessed (e.g., IP address, MAC address, applications used, applications running, etc.), duration of the PAW session, and the like.

System 100 may require identity 112 to have certain privileges to access and/or modify access-restricted network resources 104 and to access resources 104 from a secure PAW to minimize the resources' vulnerability to attack. In some embodiments, system 100 may receive a request from identity 112 to initiate a PAW to access one or more access-restricted network resources 104. The PAW established by system 100 may be a cloud PAW 108 or the PAW may be established directly on the endpoint 106 used by identity 112. Both options are possible and are a matter of system architecture and design choice. In some embodiments, to generate a cloud PAW 108, system 100 may create a new platform, e.g., VM, DOCKER container, or serverless code, to host the cloud PAW 108. In another embodiment, the identity 112 may access the access-restricted network resources 104 by elevating endpoint 106 to become a PAW.

In an example, an identity 112 may be an employee in the marketing department of an organization who is required to publish a Tweet using the organization's official TWITTER account. The organization's TWITTER credentials, i.e., username and password, are required to be handled with a high level of security. If an attacker gained the organization's log-in credentials, the attacker could publish Tweets under the organization's official account, thereby harming the company's brand and harming the company's reputation among customers for responsibly handling sensitive data. Thus, in order to publish a Tweet, the employee may be required to complete the task using a PAW. In this example, the employee may be working on a laptop belonging to the organization and assigned to that employee. To initiate a temporary PAW on the laptop, the employee may navigate to the PAW system's web interface, select an option to access the organization's TWITTER account, and request to elevate the laptop to a temporary PAW. The system may then convert the laptop into a clean and hardened workstation version, and the laptop will not have access to any other network resources, as will be further described with reference to FIGS. 2-4. For example, the system may restrict the allowed destination IP address such that the employee may only access twitter.com. Further, as discussed below, the system may blacklist other IP addresses, prevent certain laptop functionality (e.g., camera or microphone access), prevent other applications from running, prevent access to external or peripheral memory, etc. Once the PAW is created, the employee may connect to the organization's TWITTER account. Once the employee is finished with the requested task requiring a PAW, the employee may select a "finished" button displayed via graphical user interface (GUI) to end the temporary PAW session. Ending the session will return the laptop to its original state without the restrictions imposed by the PAW.

In another example, an identity may be an IT user required to install an update patch on the domain controller (DC), which is typically a privileged task. The IT user may open the PAW system's web interface and select a target destination, the DC, from a list of access-restricted network resources displayed via a graphical user interface (GUI) on the IT user's device. Upon selecting a "connect" button to initiate the PAW creation, the system creates a DOCKER container in the cloud which acts as a PAW, as described with reference to FIG. 3. The system may also retrieve privileged credentials for accessing the DC from a secured credential database or vault, and upload the credentials to the PAW. The IT user may complete the installation to the DC via the PAW. By exiting the PAW or by selecting a "finish" option in the GUI, the container hosting the PAW is deleted.

In a further example, an IT user may be required to complete a privileged task of updating a rule in a network firewall. Via a PAW web console, the IT user may select the firewall from a list of targets, upload the command for adding the new rule, and select the privileged account with administrative access to the firewall. The PAW that is created for the IT user may have various different types of network access and functionality restrictions, as discussed above. The system may automatically transmit the command to the target firewall through serverless functions that create a secure shell (SHH) connection using the selected account credentials. After the command is transmitted and the serverless functions are completed, the IT user may continue with regular tasks without the restrictions of the PAW.

Figure 2:
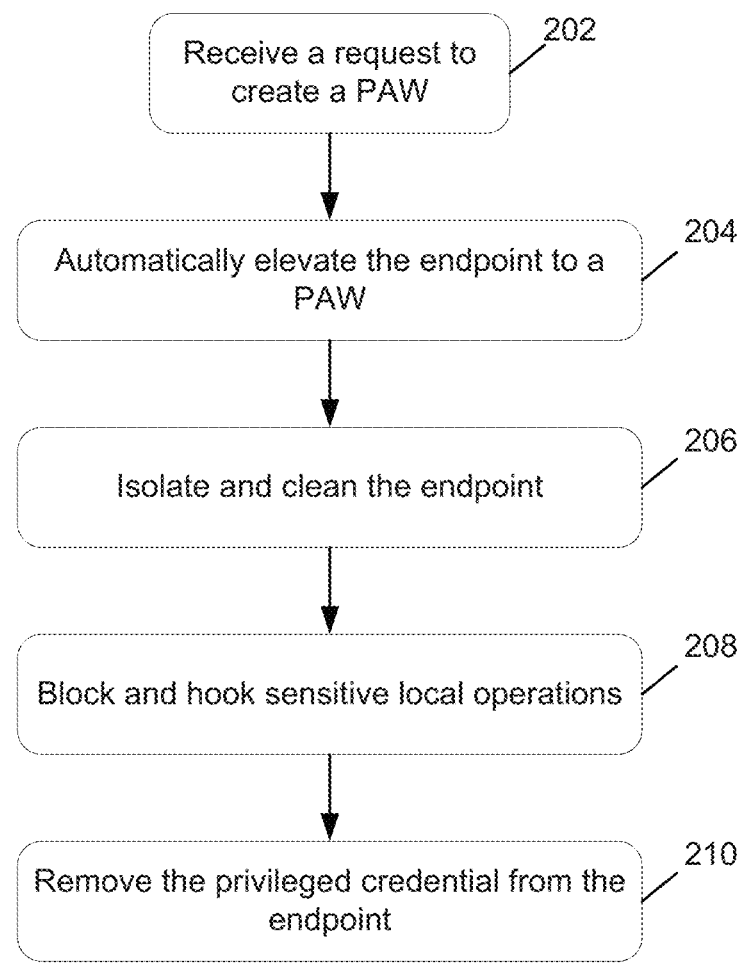
FIG. 2 is a flowchart of implementing an example dynamic PAW, in accordance with disclosed embodiments.

FIG. 2 is a block diagram illustrating a method 200 by which a user (e.g., identity 112) may start a privileged session on an endpoint (e.g., endpoint 106 or PAW 108) according to disclosed embodiments. Method 200 may be implemented by a system for automatically provisioning dynamic privileged access resources, e.g., is described above in connection with system 100. For example, as discussed further below, method 200 may be performed by an agent running on end-point machine 106 or on the target resource 104, a cloud orchestration tool that spun up cloud PAW 108, or a separate system. Examples of cloud orchestration tools include AWS™, Puppet™, Chef™, and others.

At step 202, an identity (e.g., identity 112) requests a PAW to be created on an endpoint (e.g., workstation 106). For example, identity 112 may need to access one or more access-restricted network resources 104 to complete a privileged task (e.g., modifying web content, updating a payroll database, downloading human resources records, etc.). To request a PAW, the identity 112 may request a PAW via a web-based (e.g., HTTP, HTTPS) or other type of console.

For example, if an identity 112 is required to perform a privileged task, he ordinarily needs to elevate his privileges and retrieve the privileged credentials required to carry out the task. Nevertheless, storing privileged credentials on an endpoint 106, such as a user workstation, leaves the credentials vulnerable to attack (e.g., with internet connection enabled and with unknown background processes\applications that are running on that endpoint 106). Therefore, the endpoint 106 should be elevated and converted to a safe PAW in order for the identity 112 to perform the privileged task.

In some embodiments, step 202 may further include receiving an indication of a privileged task that identity 112 wants to take on an access-restricted resource 104. For example, the indication may be that the identity 112 is seeking to update a database, create a new cloud asset, upload content to a web server, delete records in a business intelligence database, create new accounts in an employee database, etc. As further discussed below, the particular actions that identity 112 indicates it seeks to perform on an access-restricted resource 104 may be used to tailor the PAW capabilities of the workstation 106 to the minimum needed to perform the actions.

In some embodiments, before the identity 112 is permitted to elevate workstation 106 to a PAW, or request that a cloud PAW 108 be provisioned, the identity 112 must be authenticated. The identity 112 may be authenticated, for example, using various different types of authentication data, such as a password, cryptographic key, certificate, token, etc. Some embodiments may involve multi-factor authentication, which may include combinations of these authentication types. Further, some authentication may dual-band (e.g., email and password, MMS and password, fingerprint and retinal scan, etc.). If such authentication fails, the identity 112 may be denied access to a PAW.

At step 204, in response to the request, the endpoint 106 may be automatically elevated to a PAW. In some embodiments, the PAW is implemented on the endpoint 106, or workstation, from which the identity performs daily tasks, e.g., sending and receiving email, browsing the Internet, etc. In further embodiments, a cloud PAW 108 is provisioned or spun up (e.g., as a VM, DOCKER container, serverless code, etc.). Provisioning endpoint 106 or PAW 108 may involve one or more types of access-control or cleansing of the machine before it can perform a privileged function, as discussed below.

At step 206, the system isolates and cleans the end-point 106. The process of hardening the endpoint to a PAW may be executed by an agent, e.g., a software component on the endpoint 106 itself or associated with the cloud PAW 108. The agent may have full privileges in the endpoint (e.g., root privileges) and may operate as a driver with kernel privileges on the endpoint 106 or cloud PAW 108. In another embodiment, the endpoint is elevated to a PAW remotely, using privileged credentials of a local administrator on the target endpoint 106 or cloud PAW 108. In some embodiments, elevating the endpoint 106 or cloud PAW 108 to a PAW may include blocking network communications, such as by whitelisting or blacklisting certain IP or MAC addresses, disabling certain communications ports, packet filtering, etc. Further, elevating the machine to a PAW may include terminating unfamiliar processes or applications running on the machine (e.g., those not pre-approved, or those that are unknown). In some embodiments, the process may involve a forced sign-out of other local privileged accounts (e.g., access to other servers, databases, printers, etc.) that are not required for the designated PAW function. For example, the agent may block all the network interfaces of the endpoint that are unnecessary to perform the PAW function. In another example, the endpoint may be blocked from connecting to the Internet.

In some embodiments, the lockdown process of the endpoint 106 may be trigged automatically. For example, when the agent detects a privileged account logged on to the endpoint 106, the PAW conversion process is triggered automatically. Such "on the fly" PAW creation may increase convenience and efficiency. In other embodiments, the lockdown process is performed automatically when an identity 112 seeks to perform a privileged action (e.g., on an access-restricted resource 104). In further embodiments, the identity 112 is presented with a graphical user interface with a prompt confirming that machine 106 will undergo a lockdown process in order to accomplish the privileged function.

In some embodiments, the PAW's agent may be configured to postpone the PAW creation and perform an additional examination of the PAW creation request. For example, the additional examination may be performed by artificial intelligence (AI) and/or machine learning algorithms. This may involve maintaining data on the same identity's 112, or other identities', actions in a network. Patterns in the data may indicate when an identity 112 is going to access a privileged resource 104. For example, a pattern may indicate that whenever identity 112 logs into a particular web development software application, there is a 99.9% chance that the identity 112 next seeks to access a web development server that requires privileged access. Further, patterns may indicate that whenever a particular identity 112 accesses a first IoT device in a home automation network, there is a 99.7% chance that the identity 112 next accesses a second IoT device in the network. In such cases, the AI or machine learning may automatically request creation of a PAW for the identity 112 based on a prediction of what type of network access the identity 112 will next take.

Either before, after, or concurrent with isolating and cleaning the endpoint, the system may perform further lockdown measures, such as those of steps 208 and 210. At step 208, for example, the system may block and hook sensitive local operations on the endpoint 106. For example, the system may block and secure local operating system (OS) operations, network actions, file permissions, and registry actions. For example, certain calls to an OS may be deemed impermissible during a PAW session, and thus may be hooked to other allowable operations, or may be hooked to generate a graphical user interface prompt confirming that the requested action is impermissible. In some embodiments, the agent may terminate unfamiliar processes (e.g., unknown or unapproved applications), or irregular processes (e.g., applications exhibiting unusually high or low processing activity), which may be running as malware on endpoint 106. In some embodiments, the agent may have a whitelist of the allowed, benign processes. The whitelist may be created, for example, by taking a snapshot of a clean and out-of-the-box workstation, which would be free of malware. Further, the whitelist may be created by determining the minimum set of applications that endpoint 106 requires in order for the PAW to be configured and deployed.

In some embodiments, the endpoint 106 may load a "white image." For example, the endpoint 106 may be restarted, and on its subsequent launch it may load a new OS image from the network, from the cloud, or from its local hard disk. In some embodiments, the white image may include a replacement of all the RAM memory and OS. After the identity finishes the privileged task, the endpoint may be restarted again and may be launched from the previous state of the OS and will recover the previous RAM memory.

In some embodiments, the agent may add security mechanisms to the newly created PAW. For example, the agent may block and/or secure sensitive local OS or application commands. In some embodiments, the agent may block new network sockets from being created, block file writing, block modification of registry keys, etc.

In some embodiments, the agent may make sure there are no other local admin accounts currently logged in on the endpoint 106. For example, a local admin logon session in the background may enable the local admin to steal the credentials of the privileged account from the memory of the endpoint. In some embodiments, the agent may ensure that there are no other local admin accounts logged in on the endpoint 106 in parallel to the privileged account. The agent may force the local accounts to sign out before the credentials of the privileged account are loaded to, or made available to, the newly created PAW.

After the endpoint PAW 106 or cloud PAW 108 has been locked down and configured for the PAW session, as discussed above, the identity 112 may perform an intended privileged function on access-restricted resource 104. For example, as discussed above, this may involve accessing a server, uploading content, deleting files, creating new accounts, modifying a database, etc.

When the identity 112 is finished with the privileged task, the identity 112 may select a "finish" option or exit the PAW. In further embodiments, the identity 112 may be timed out of performing the privileged task. For example, certain privileged actions may have a certain time interval during which a PAW is permitted. Further, there may be default time intervals for different types of PAWs or for different types of privileged actions. When an identity 112 has timed out its PAW session, the session may be automatically terminated, or the identity 112 may be given an opportunity to continue the session (e.g., by re-authenticating itself, by confirming what privileged activity it is performing, etc.).

At step 210, in response to a command from the identity 112 to end the PAW session, or a timeout occurring, the agent may roll back the endpoint 106 and restore the settings of the endpoint 106 to how they were before the PAW was provisioned. For example, the agent may remove any privileged credentials (e.g., passwords, hashes, cryptographic keys, certificates, tokens, etc.) that were stored on the endpoint 106 to perform a privileged function when the session ends, and the PAW may be converted back to a regular endpoint 106. Thus, if future malware compromises the endpoint 106 or a malicious actor takes control of the endpoint 106, they will not be able to steal privileged credentials from within that endpoint 106. In some embodiments, the agent may restart the endpoint 106, or delete the Local Security Authority Subsystem Service (Lsass) process memory where the privileged credentials are being loaded\stored.

Figure 3:
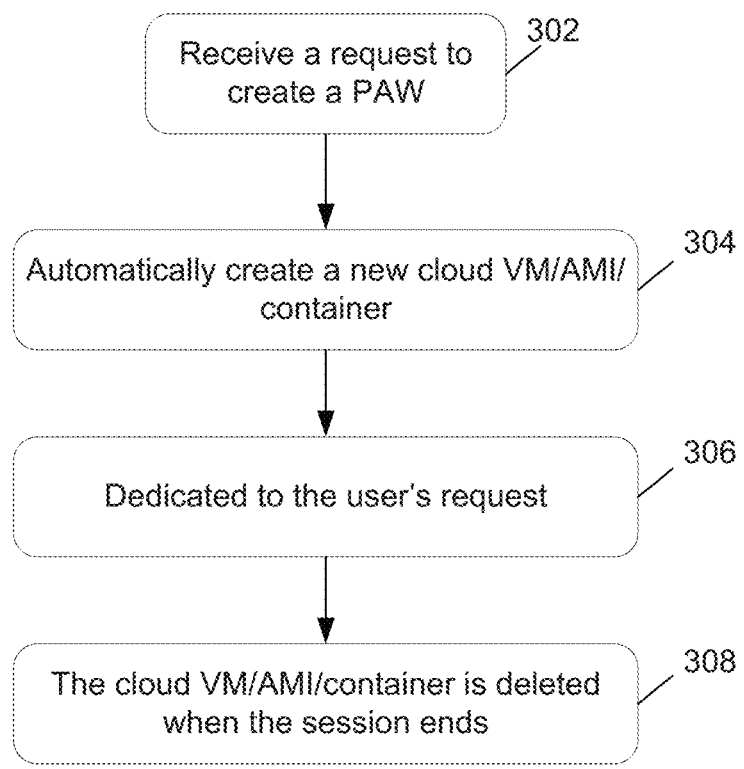
FIG. 3 is another flowchart of implementing an example dynamic PAW, in accordance with disclosed embodiments.

FIG. 3 is a block diagram illustrating a method 300 by which an identity (e.g., identity 112) may start a cloud-based privileged session according to disclosed embodiments. Method 300 may be implemented by a system for automatically provisioning dynamic privileged access resources, e.g., system 100. For example, method 300 may be implemented by an agent running on endpoint machine 106 or on the target resource 104, a cloud orchestration tool that spun up cloud PAW 108, or a separate system. Method 300 may be similar to method 200, and each may incorporate steps or functions from each other.

At step 302, an identity 112 may request a cloud-based PAW to be created (e.g., spun up or provisioned based on an existing VM or DOCKER container) through which the identity 112 may access an access-restricted network resource 104. For example, identity 112 may need to access one or more access-restricted network resources 104 to complete a privileged task, as discussed above in connection with FIG. 2. To request the provisioning of a cloud-based PAW 108, the identity 112 may request a cloud-based PAW via a web console or other graphical user interface, as discussed above. In some embodiments, an agent is not required to harden the endpoint 106 itself, and the endpoint 106 remains unaltered. Instead, the cloud PAW 108 is hardened and cleansed, as needed.

At step 304, the system may automatically create a new cloud privileged resource (e.g., VM, DOCKER container, serverless code, etc.). In some embodiments, the system may provision a cloud-based PAW 108 made for the identity's 112 specific privileged task. For example, if the identity 112 wants to connect to the DC of the organization, the system will create a new cloud-based resource for performing that task. In some embodiments, because the new cloud-based resource 108 is a new resource created at the time of the PAW request, it is thus clean from malware. If the resource 108 is a serverless function, there is little or no risk of malwares because serverless functions are code and commands being executed on the cloud on-demand and cannot be changed.

At step 306, any required privileged credentials (e.g., passwords, hashes, cryptographic keys, certificates, tokens, etc.) may be loaded to the new cloud resource 108 such that the identity 112 may perform the privileged task from the newly created cloud PAW 108. In some embodiments, the resource 108 may act as a proxy, allowing the identity to connect to the cloud PAW 108 and then, from the cloud PAW 108, to connect forward to the target resource 104.

The type of the cloud resource 108 may depend upon the identity's 112 privileged task (e.g., as specified in the request for a PAW or request for privileged access) and upon the nature of the target asset 104. In some embodiments, the PAW type may be defined in advanced. For example, PAW types may include sessions focused on accessing data on a server, updating a database, modifying web content, etc. In another embodiment, the system may include a machine learning algorithm or AI configured to learn and automatically correlate a certain PAW type to a corresponding privileged task, as discussed above. In one example, if the identity 112 requires a native remote desktop protocol (RDP) connection to the target asset 104, the cloud resource 108 will be a VM running on the cloud platform. In another example, if the identity 112 wants to connect via RDP with a faster connection, the cloud resource 108 may be an RDP connection from a Linux-based machine. The Linux-based machine instance may also act as a DOCKER container and not as a full VM. Thus, the Linux-based machine instance may run more quickly and dynamically.

In some embodiments, the cloud resource 108 may use a SSH connection in its connections to endpoint 106 or target resource 104. For example, if the identity 112 needs to perform a specific privileged task, the task may be served by serverless functions that will perform the actions required to complete the task on the identity's 112 behalf. As an example, an identity 112 may send a privileged configuration command via SSH connection to a target firewall in the network. In this example, the identity 112 may securely provide the command. A serverless function in the cloud may be launched and may connect to the target firewall via SSH protocol to send and execute the identity's 112 command on his behalf. In this example, the privileged credential of the firewall admin is not sent to the identity 112 or to the endpoint 106, but instead the credentials are only used by the serverless functions service in the cloud.

In some embodiments, the cloud resource 108 is dedicated to the identity's 112 request and thus it will only have network access to the requested target asset 104. For example, the cloud resource 108 may have a whitelisted IP or MAC address corresponding to the target resource 104. The cloud resource 108 may further only include the necessary software for the identity's 112 task, as discussed above. For example, a newly created container may be launched with only the necessary applications to complete the identity's 112 task (e.g., only PuTTy software will be installed for the need of SSH connection).

At step 308, when the identity 112 finishes the privileged task or a timeout for the PAW session ends, the cloud resource 108 may be deleted entirely, and the session ended. Alternatively, a VM or DOCKER container that served as the cloud PAW 108 may be repurposed and used in another application. Method 300 may be more efficient and have lower costs than other methods for implementing PAWs because the cloud resource 108 may only need to run during the time needed to perform the privileged task. Subsequently, when there are no privileged tasks to execute, the organization does not incur any added infrastructure costs because no cloud resource 108 functions are needed.

In some embodiments, for increased security, the endpoint's 106 agent or the cloud framework may monitor the endpoint 106 and alert the system each time a PAW is created, and send data on the created sessions to a database, e.g., auditing system 110. In some embodiments, the information may be sent to a monitoring, security, or performance server configured to analyze each newly created PAW and its profile. In another embodiment, the system may use AI or machine learning algorithms to build and classify the different PAW profiles. Thus, the system may detect and block suspicious PAW creations or alert an administrator of a suspicious PAW creation. Real-time monitoring may enable security teams to track user activity and detect suspicious events in real-time. Further, such monitoring may detect when a PAW session has continued after a timeout period, which may be a sign of potentially malicious activity. Additionally, remote session termination may enable security teams to immediately terminate suspicious privileged sessions directly from an administrative console.

In some embodiments, the system may perform forensic analysis when an unauthorized PAW creation request is processed and denied (e.g., because of failed authentication, because of a request to an access-restricted resource that does not exist or is outdated, etc.). For example, forensic analysis may include a memory dump, gathering OS information (names of the running processes, opened network sockets, etc.), and collect historical logs from the workstation. In some embodiments, the forensics details may be sent to an administrator or administrator system before the PAW creation is approved.

In some embodiments, the agent may audit the PAW creation process, for example, by recording the user initiation command request. The system may store in a repository, e.g., auditing system 110, searchable, detailed session audit logs and/or video recordings accessible by security teams. If a malicious or suspicious incident occurs, the security teams may pinpoint the when the incident was started, confirm what IP or MAC addresses were involved, understand how the incident began, and quickly assess damage resulting from the incident.

In another embodiment, the system may be configured to communicate with the secured storage 118 of the auditing system 110. In some embodiments, the PAW system may trigger or invoke a credential change or credential reset of the detected privileged credential used in the newly created\requested PAW. For example, after an identity 112 performs a privileged task through the system's dynamic created PAW, the credentials may be modified as an additional security step to protect the stored credentials of the privileged account. Thus, a subsequent PAW request will require the identity 112 to create a new request for a PAW session through the system because the previous credentials used in the previous session are not valid anymore.

In some embodiments, the agent may have advanced restriction capabilities. For example, certain commands may only be sent from a unique restricted workstation 106. The system may also limit the identity's 112 allowed keyword presses and available commands. Only limited processes may be run, and all others may be terminated, and the user may be restricted to only certain allowed applications. Additionally, some or all opened network sockets may be disabled, the local firewall at the workstation 106 may be updated to block some or all incoming and outbound connections, and only the connection to the target resource 104 may be approved.

In some embodiments, the agents may automatically learn to identify benign and legitimate workstations 106 through their regular operations. For example, in an organization having 1,000 workstations, the different agents on all the workstations may communicate between themselves and build a reputation risk grade for every file\process\IP\registry on the workstations. In this manner, the agents may have recommendations and knowledge about the clean "white image" that PAWs should be built upon, about specific applications that should be blocked, about certain OS commands that should be hooked, about certain files that should be deleted, etc.

Figure 4:
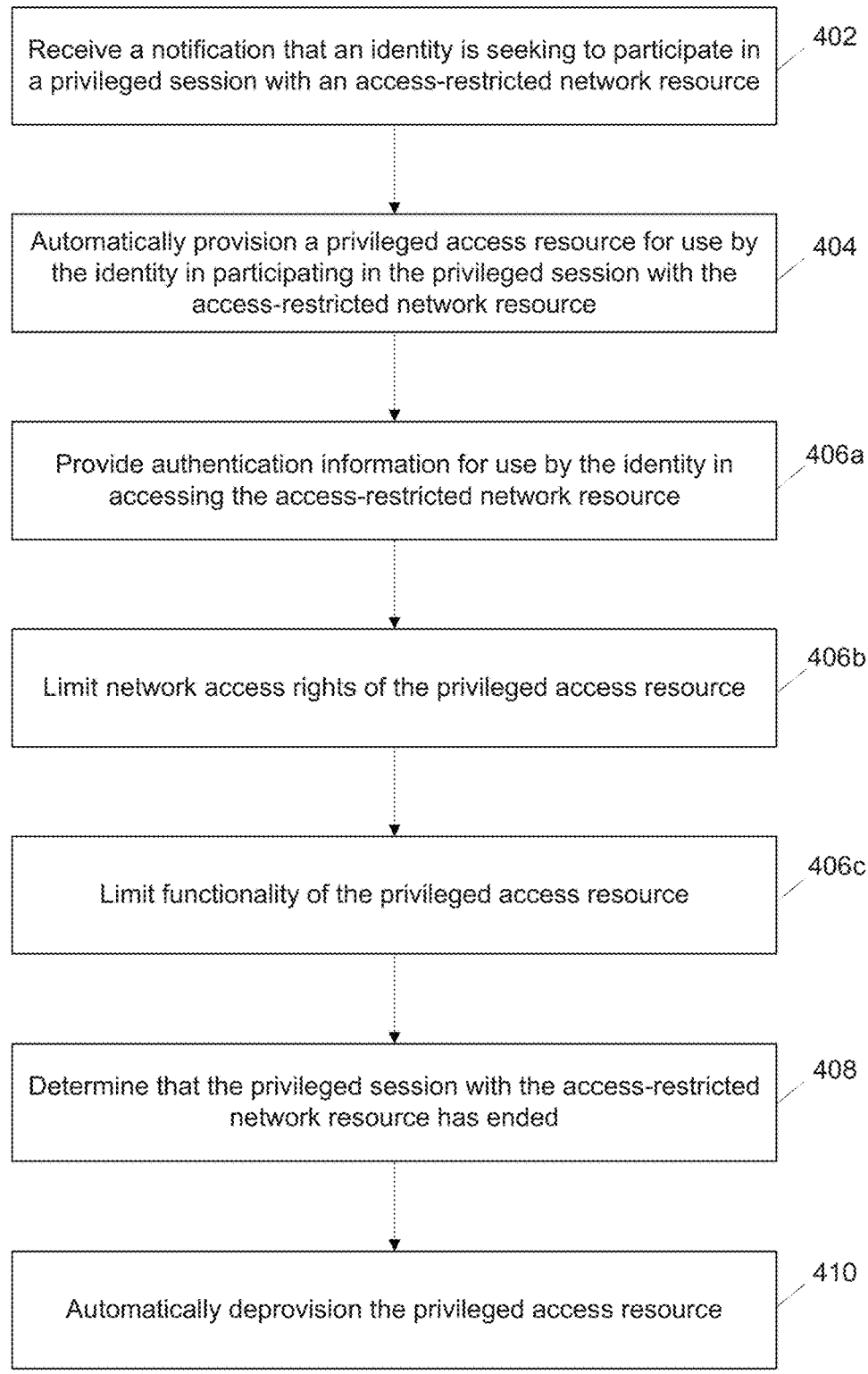
FIG. 4 is a flowchart for an example process for automatically provisioning dynamic privileged access resources, consistent with disclosed embodiments.

FIG. 4 is a flowchart of an exemplary process 400 for automated creation of dynamic PAWs consistent with disclosed embodiments according to disclosed embodiments. Consistent with the above disclosure, method 400 may be performed in the system of FIG. 100. Further, method 400 may be implemented by an agent running on endpoint machine 106 or on the target resource 104, a cloud orchestration tool that spun up cloud PAW 108, or a separate system. Method 400 may be similar to methods 200 and 300, and each may incorporate steps or functions from each other.

At step 402, the system, e.g., an agent or other system as discussed above, receives a notification that an identity, e.g., identity 112, is seeking to participate in a privileged session with an access-restricted network resource, e.g., resource 104. This may be, in some implementations, similar to operation 202 of FIG. 2 or operation 302 of FIG. 3. In some embodiments, the notification may be received by a software agent running locally on a computing device associated with the identity (e.g., endpoint 106). In other embodiments, the notification may be received by a server remote from a computing device associated with the identity. In further embodiments, the notification is received based on an AI or machine learning process that predicts that the identity 112 will seek to participate in the privileged session with the access-restricted network resource 104, as discussed above.

The system may receive the notification automatically based on monitoring activities of the identity 112. For example, the identity's 112 outbound network communications may be monitored. Such communications may be received by an agent, as discussed above, or by a server (e.g., proxy server) that intercepts outgoing communications from the identity 112. Alternatively, the inbound network communications of the target resource 104 may be monitored. In other embodiments, the system may receive the notification based on a request by the identity 112 to provision the privileged access resource. As discussed, the notification in some embodiments may further include an identification of a particular privileged activity that the identity 112 seeks to take with respect to the target resource 104 (e.g., file access, modification, addition, deletion, etc.).

At step 404, the system may automatically provision a privileged access resource, e.g., endpoint 106 or cloud resource 108, for use by the identity in participating in the privileged session with the access-restricted network resource, e.g., resource 104. For example, the system may harden the endpoint 106 or provision a VM or container, as discussed with reference to FIG. 2 and FIG. 3. The hardening process may involve controlling various aspects of the endpoint's 106 or cloud resource's 108 functionality and capabilities, as discussed above. The hardened or provisioned privileged access resource may be an on-premises computer system being used by the identity or may be a virtual computing resource spun up for use by the identity. The virtual machine or container may be dynamically spun up in response to the notification received by the system at step 402. In some embodiments, the virtual computing resource is a serverless code element that is invoked irrespective of any particular designated VM or container.

Automatically provisioning a privileged access resource may involve steps, including one or more of the steps shown in FIG. 4 as steps 406a, 406b, and 406c. Additional steps may be performed as well in the course of automatically provisioning a privileged access resource.

At step 406a, the system may provide authentication information for use by the identity in accessing the access-restricted network resource. For example, the system may provide authentication information to the privileged access resource for use by the identity 112. As discussed above, examples of authentication information include passwords, hashes of passwords, cryptographic keys, certificates, tokens, etc. In some embodiments, the system may enable the privileged access resource to use the authentication information without providing the authentication information to the privileged access resource. For example, the authentication information needed to access an access-restricted resource 104 may be stored in a secure vault (e.g., CyberArk Vault™) but made inaccessible to the identity 112. Further, in some embodiments as discussed above, the identity's 112 permission to obtain or use authentication information may be conditioned on the identity 112 first authenticating itself to another system.

At step 406b, the system may limit the access rights of the privileged access resource. As described with reference to FIG. 2, the system may isolate and clean the user's workstation prior to elevating the workstation to a PAW. In some embodiments, the system may limit the IP addresses with which the privileged access resource is allowed to communicate. Further, the system may utilize whitelists, blacklists, or combinations thereof in limiting the network communications abilities of the privileged access resource. In addition, an agent monitoring the communications activity of the privileged access resource, or a proxy server that intercepts its communications, may filter network communications during a PAW mode of operation. Various other forms of limiting the network access rights of the privileged access resource are possible as well, as discussed above.

At step 406c, the system may limit the functionality of the privileged access resource. For example, as described with reference to FIG. 2, the system may terminate unfamiliar or irregular processes, and block local functionality connections to the resource. In some embodiments, the system may block a local operation on the privileged access resource. In another embodiment, the system may hook a local operation (e.g., OS calls, application functions, network requests, etc.) on the privileged access resource. In some embodiments, the system may terminate a non-permitted process running on the privileged access resource and/or force the identity 112 to terminate an open account session. Steps 406a, 406b, and 406c may occur simultaneously, in tandem, or in connection with additional steps of locking down or cleaning a privileged access resource.

At step 408, the system may determine that the privileged session with the access-restricted network resource 104 has ended. For example, the system may receive a command from the identity 112 to terminate the session, may determine that a timeout of the PAW session has occurred, etc. In some embodiments, the virtual computing system may be dynamically terminated in response to the determination that the privileged session with the access-restricted network resource has ended. For example, if the request leading to the provisioning of the PAW identified a particular privileged task to be performed (e.g., spinning up a new cloud resource, creating a new database entry, etc.), the PAW session may automatically end once the task has been performed. Further, if an identity 112 experiences a period of inactivity, or logs out of a machine 106, the PAW session may automatically end. Other triggering events for terminating the PAW session are possible as well.

At step 410, the system may automatically deprovision the privileged access resource. For example, the system may delete the cloud resource 108 serving as the PAW, may repurpose such a cloud resource 108, may remove the security limitations imposed in operations 406a-b-c on an endpoint 106, or may restart and revert the endpoint 106. In some embodiments, the system may revoke the identity's access to the authentication information. For example, any authentication (e.g., password, hash, cryptographic key, token, certificate, etc.) that was stored on the endpoint 106 may be deleted.

It is to be understood that the disclosed embodiments are not necessarily limited in their application to the details of construction and the arrangement of the components and/or methods set forth in the following description and/or illustrated in the drawings and/or the examples. The disclosed embodiments are capable of variations, or of being practiced or carried out in various ways.

The disclosed embodiments may be implemented in a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowcharts and block diagrams in the Figures illustrate the architecture, functionality, and operation of possible implementations of systems, methods and computer program products according to various embodiments of the present invention. In this regard, each block in the flowcharts or block diagrams may represent a software program, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It is expected that during the life of a patent maturing from this application many relevant virtualization platforms, virtualization platform environments, trusted cloud platform resources, cloud-based assets, protocols, communication networks, security tokens and authentication credentials will be developed and the scope of these terms is intended to include all such new technologies a priori.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

What is claimed is:

1. A non-transitory computer readable medium including instructions that, when executed by at least one processor, cause the at least one processor to perform operations for automatically provisioning dynamic privileged access resources, the operations comprising:
   receiving a notification that an identity is seeking to participate in a privileged session with an access-restricted network resource or seeking to perform a privileged action with the access-restricted network resource;
   automatically provisioning, in response to the notification, a dynamic privileged access resource for use by the identity in participating in the privileged session with the access-restricted network resource, the dynamic privileged access resource being provisioned to account for one or more changes occurring in a network environment, the one or more changes comprising an elevation of the identity's privileged access rights, wherein the automatically provisioning includes at least one of:
      providing authentication information for use by the identity in accessing the access-restricted network resource;
      limiting network access of the privileged access resource based on: network access rights needed to participate in the privileged session with the access-restricted network resource or the privileged action the identity is authorized to perform; and
      limiting functionality of the privileged access resource based on: functionality needed to participate in the privileged session with the access-restricted network resource or the privileged action the identity is authorized to perform;
   controlling a local operation running locally on a computing device associated with the identity seeking to participate in a privileged session with the access-restricted network resource or seeking to perform a privileged action with the access-restricted network resource, the controlling including at least one of:
      instructing the computing device associated with the identity to terminate an unfamiliar process or application running locally on the computing device while still permitting the identity to participate in the privileged session with the access-restricted network resource or to perform the privileged action with the access-restricted network resource; and instructing the computing device associated with the identity to terminate an irregular process or application running locally on the computing device while still permitting the identity to participate in the privileged session with the access-restricted network resource or to perform the privileged action with the access-restricted network resource;

determining that the privileged session with the access-restricted network resource has ended or that the privileged action has been performed; and automatically deprovisioning, based on the determination, the privileged access resource.

2. The non-transitory computer readable medium of claim 1, wherein the privileged access resource is an on-premises computer system being used by the identity.

3. The non-transitory computer readable medium of claim 2, wherein the automatically provisioning includes automatically elevating the identity's privileged access rights.

4. The non-transitory computer readable medium of claim 1, wherein the privileged access resource is a virtual computing resource spun up for use by the identity.

5. The non-transitory computer readable medium of claim 4, wherein the virtual computing resource is dynamically spun up in response to the notification.

6. The non-transitory computer readable medium of claim 4, wherein the virtual computing resource is a serverless code element.

7. The non-transitory computer readable medium of claim 4, wherein the virtual computing resource is dynamically terminated in response to the determination that the privileged session with the access-restricted network resource has ended.

8. The non-transitory computer readable medium of claim 1, wherein providing the authentication information includes providing the authentication information to the privileged access resource for use by the identity.

9. The non-transitory computer readable medium of claim 1, wherein providing the authentication information includes enabling the privileged access resource to use the authentication information without providing the authentication information to the privileged access resource.

10. The non-transitory computer readable medium of claim 1, wherein automatically deprovisioning the privileged access resource includes revoking the identity's access to the authentication information.

11. The non-transitory computer readable medium of claim 1, wherein limiting the network access rights of the privileged access resource includes limiting the IP addresses with which the privileged access resource is allowed to communicate.

12. The non-transitory computer readable medium of claim 1, wherein limiting the functionality of the privileged access resource includes blocking the local operation running locally on the computing device associated with the identity.

13. The non-transitory computer readable medium of claim 1, wherein limiting the functionality of the privileged access resource includes hooking the local operation running locally on the computing device associated with the identity.

14. A computer-implemented method for automatically provisioning dynamic privileged access resources, the method comprising:

receiving a notification that an identity is seeking to participate in a privileged session with an access-restricted network resource or seeking to perform a privileged action with the access-restricted network resource;

automatically provisioning, in response to the notification, a dynamic privileged access resource for use by the identity in participating in the privileged session with the access-restricted network resource, the dynamic privileged access resource being provisioned to account for one or more changes occurring in a network environment, the one or more changes comprising an elevation of the identity's privileged access rights, wherein the automatically provisioning includes at least one of:

providing authentication information for use by the identity in accessing the access-restricted network resource;

limiting network access of the privileged access resource based on: network access rights needed to participate in the privileged session with the access-restricted network resource or the privileged action the identity is authorized to perform; and limiting functionality of the privileged access resource based on functionality needed to participate in the privileged session with the access-restricted network resource or the privileged action the identity is authorized to perform;

controlling a local operation running locally on a computing device associated with the identity seeking to participate in a privileged session with the access-restricted network resource or seeking to perform a privileged action with the access-restricted network resource, the controlling including at least one of:

instructing the computing device associated with the identity to terminate an unfamiliar process or application running locally on the computing device while still permitting the identity to participate in the privileged session with the access-restricted network resource or to perform the privileged action with the access-restricted network resource; and instructing the computing device associated with the identity to terminate an irregular process or application running locally on the computing device while still permitting the identity to participate in the privileged session with the access-restricted network resource or to perform the privileged action with the access-restricted network resource;

determining that the privileged session with the access-restricted network resource has ended or that the privileged action has been performed; and automatically deprovisioning, based on the determination, the privileged access resource.

15. The computer-implemented method of claim 14, wherein the notification is received by a software agent running locally on the computing device associated with the identity.

16. The computer-implemented method of claim 14, wherein the notification is received by a server remote from the computing device associated with the identity.

17. The computer-implemented method of claim 14, wherein the notification is received based on a machine learning process that predicts that the identity will seek to participate in the privileged session with the access-restricted network resource.

18. The computer-implemented method of claim 14, wherein limiting the functionality of the privileged access resource includes terminating a non-permitted process running on the privileged access resource.

19. The computer-implemented method of claim 14, wherein limiting the functionality of the privileged access resource includes forcing the identity to terminate an open account session.

20. The computer-implemented method of claim 14, wherein automatically provisioning the privileged access resource includes restarting the privileged access resource.

21. The computer-implemented method of claim 14, wherein automatically provisioning the privileged access resource includes installing an application on the privileged access resource for use by the identity in accessing the access-restricted network resource.

22. The computer-implemented method of claim 14, wherein automatically deprovisioning the privileged access resource includes deleting a local process memory associated with the privileged access resource.

23. The computer-implemented method of claim 14, wherein receiving the notification occurs automatically based on monitoring activities of the identity.

24. The computer-implemented method of claim 14, wherein receiving the notification occurs based on a request by the identity to provision the privileged access resource.

* * * * *